United States Patent
Park et al.

(10) Patent No.: US 7,983,449 B2
(45) Date of Patent: Jul. 19, 2011

(54) SYSTEM, METHOD, AND MEDIUM FOR DETECTING MOVING OBJECT USING STRUCTURED LIGHT, AND MOBILE ROBOT INCLUDING SYSTEM THEREOF

(75) Inventors: Jun-ho Park, Hwaseong-si (KR); Dong-ryeol Park, Hwaseong-si (KR); Seok-won Bang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1016 days.

(21) Appl. No.: 11/772,500

(22) Filed: Jul. 2, 2007

(65) Prior Publication Data

US 2008/0008353 A1    Jan. 10, 2008

(30) Foreign Application Priority Data

Jul. 5, 2006 (KR) .................. 10-2006- 0063156

(51) Int. Cl.
*G06K 9/00* (2006.01)
(52) U.S. Cl. ........................................ 382/103
(58) Field of Classification Search .................. 382/103, 382/107; 348/169, 208.14; 901/47
See application file for complete search history.

(56) References Cited

U.S. PATENT DOCUMENTS

| | | | | |
|---|---|---|---|---|
| 5,109,425 A | * | 4/1992 | Lawton | 382/107 |
| 5,400,244 A | * | 3/1995 | Watanabe et al. | 701/28 |
| 5,673,082 A | * | 9/1997 | Wells et al. | 348/139 |
| 5,852,672 A | * | 12/1998 | Lu | 382/154 |
| 5,981,965 A | * | 11/1999 | Pryor et al. | 250/559.23 |
| 6,064,749 A | * | 5/2000 | Hirota et al. | 382/103 |
| 6,377,700 B1 | * | 4/2002 | Mack et al. | 382/154 |
| 2002/0114531 A1 | * | 8/2002 | Torunoglu | 382/255 |
| 2004/0125205 A1 | * | 7/2004 | Geng | 348/142 |
| 2005/0131607 A1 | * | 6/2005 | Breed | 701/45 |
| 2005/0232467 A1 | * | 10/2005 | Mohri et al. | 382/103 |
| 2005/0244033 A1 | * | 11/2005 | Ekin et al. | 382/103 |
| 2005/0248654 A1 | | 11/2005 | Tsujino et al. | |
| 2006/0018539 A1 | * | 1/2006 | Sato et al. | 382/173 |

FOREIGN PATENT DOCUMENTS

| | | |
|---|---|---|
| CN | 1698067 | 11/2005 |
| KR | 10-2001-0021751 | 3/2001 |
| KR | 10-2004-0033986 | 4/2004 |
| KR | 10-2004-0101920 | 12/2004 |

OTHER PUBLICATIONS

Chinese Office Action dated Aug. 21, 2009, issued in corresponding Chinese Patent Application No. 200710128233.X.

(Continued)

*Primary Examiner* — Matthew C Bella
*Assistant Examiner* — Shervin Nakhjavan
(74) *Attorney, Agent, or Firm* — Staas & Halsey LLP

(57) ABSTRACT

A system, a method, and medium for detecting a moving object using a structured light, and a mobile robot including the system are provided. The system includes an image obtaining unit to obtain a first image at a predetermined position and a second image at a position after a movement of the system by using a light source; an image predicting unit to predict the second image at the position after the movement of the system by using the first image and information with respect to the movement of the system; and a comparing/analyzing unit to compare and analyze the second image obtained by the image obtaining unit and the second image predicted by the image predicting unit.

25 Claims, 12 Drawing Sheets

OTHER PUBLICATIONS

D.K. Noh et al., "A Study on the Relative Localization Algorithm for Mobile Robots using a Structured Light Technique", Journal of Control, Automation, and Systems Engineering vol. 11, No. 8, Aug. 2005, pp. 678-687.

Notice of Examination Report issued in corresponding Korean Patent Application No. 10-2006-0063156, on Sep. 20, 2007.

* cited by examiner

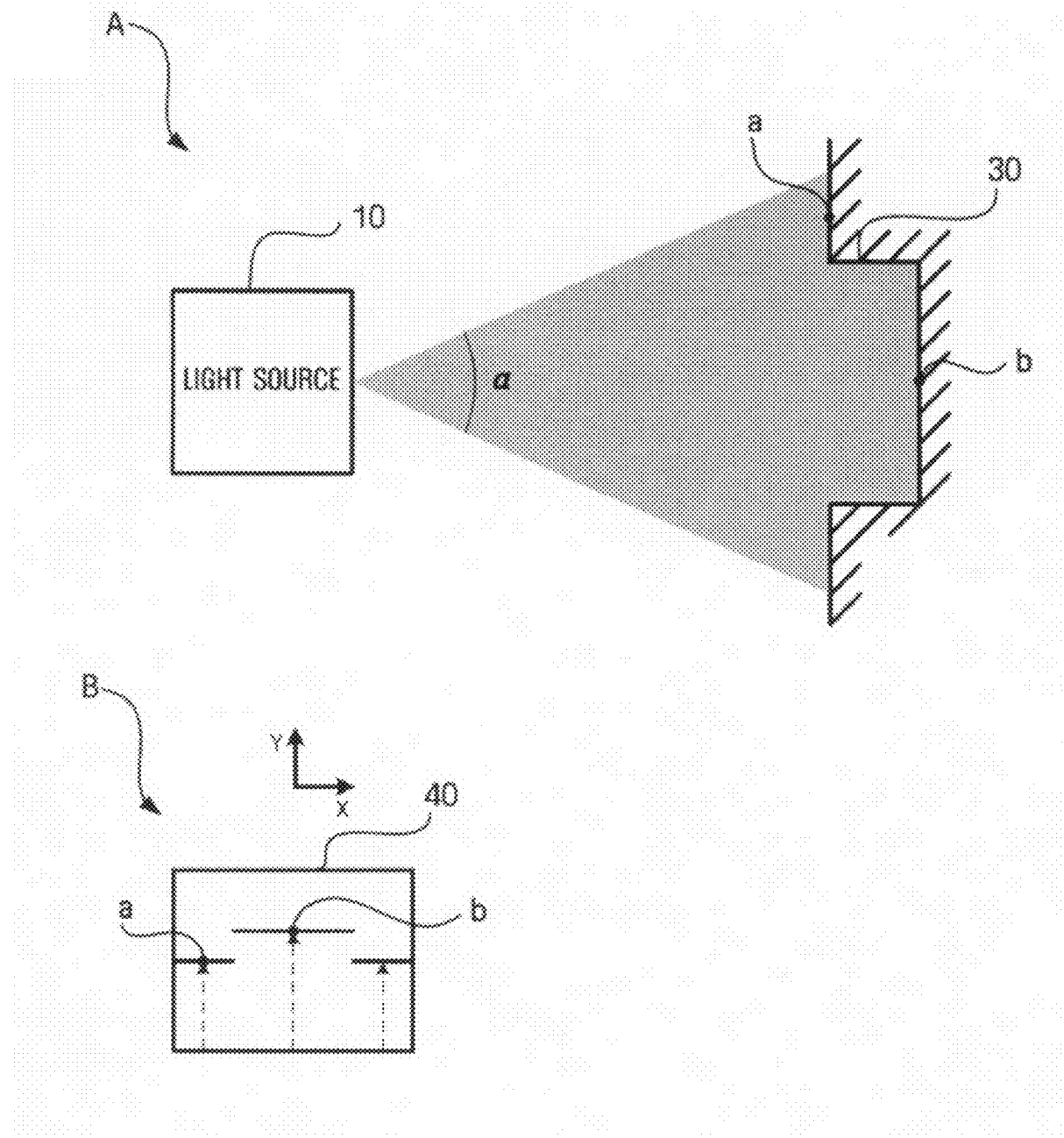

CORNER OF WALL

FIRST STRUCTURED LIGHT IMAGE

SECOND STRUCTURED LIGHT IMAGE

FIRST STRUCTURED LIGHT IMAGE

SECOND STRUCTURED LIGHT IMAGE

SYSTEM, METHOD, AND MEDIUM FOR DETECTING MOVING OBJECT USING STRUCTURED LIGHT, AND MOBILE ROBOT INCLUDING SYSTEM THEREOF

CROSS-REFERENCE TO RELATED APPLICATIONS

This application claims priority benefit of Korean Patent Application No. 10-2006-0063156 filed on Jul. 5, 2006 in the Korean Intellectual Property Office, the disclosure of which is incorporated herein by reference in its entirety.

BACKGROUND

1. Field

Embodiments relate to detecting a moving object using a structured light, and more particularly, to a system, a method, and medium that can detect the moving object even while moving by predicting an image after the movement from an existing image and comparing the predicted image with the present image, detect a broad range, and detect the moving object even when lighting is absent.

2. Description of the Related Art

As recognition ability and determination ability are added to a robot that has been used in industrial sites to perform simple assembling or processes, the robot is developed to perform more advanced functions.

Moreover, unlike a stationary robot fixed in a certain place or installed in a preconfigured work environment, a mobile robot that can move by itself can be used in an extended work area such as an arbitrary work place or an outdoor place. Accordingly, the mobile robot is superior to the stationary robot because the mobile robot can perform more various roles and tasks.

As the necessity that protects and surveys human resources or technical resources increases, the importance of a security system and surveillance system has been gradually increased. If a security system and surveillance system could be developed to survey a moving object while the security system and surveillance system are mounted on a mobile robot which has departed from a stationary work area, the mounted security system and surveillance system would effectively provide security and surveillance.

Most detecting apparatuses of the related art are configured so as to survey only a certain range by using one stationary camera. That is, the detecting apparatus according to the related art expects a photographic angle in advance and photographs within only the expected angle. Therefore, the surveillance apparatus according to the related art could observe only a limited range.

Accordingly, when a surveillance position changes and a change of a photographic angle is required, the installed camera device is re-installed. Therefore, in the case of detecting a number of ranges in one space, a number of cameras should be installed.

A method for actively detecting a moving object according to the related art stores an image signal in a stationary image apparatus, creates a differential image by comparing the stored image with the present image, and extracts the moving object. In the above method, the image apparatus also obtains the image signal in only the stationary state. Therefore, a method, in which an image apparatus can detect a moving object while the image apparatus is moving, is not provided.

SUMMARY

Embodiments provide an apparatus, method, and medium to solve the above-described problems. In an aspect, there is provided a system and a method for detecting a moving object, and a mobile robot including the system that can detect the moving object even while the mobile robot is moving by predicting an image after the movement from an existing image and comparing the predicted image with the present image.

According to an aspect, there is provided a system for detecting a moving object using a structured light, the system including an image obtaining unit to obtain a first image at a predetermined position and a second image at a position after a movement of the system by using a light source; an image predicting unit to predict the second image at the position after the movement of the system by using the first image and information pertaining to the movement of the system; and a comparing/analyzing unit to compare and analyze the second image obtained by the image obtaining unit and the second image predicted by the image predicting unit to detect the moving object.

According to another aspect, there is provided a method for detecting a moving object using a structured light, the method including obtaining a first image at a predetermined position by using a light source; predicting a second image at a position after the movement of the system by using the first image and information pertaining to the movement of the system; obtaining the second image at the position after the movement of the system; and detecting the moving object by comparing the predicted second image with the obtained second image.

According to still another aspect, there is provided a mobile robot for a moving object using a structured light, the robot including a system to detect a moving object; and a driving system to drive the mobile robot which calculates position and recognizes the moving object. In addition, the system for detecting the moving object includes an image obtaining unit to obtain a first image at a predetermined position and a second image at a position after a movement of the system by a light source; an image predicting unit to predict the second image at the position after the movement of the system by using the first image and information pertaining to the movement of the system; and a comparing/analyzing unit to compare and analyze the second image obtained by the image obtaining unit and the second image predicted by the image predicting unit to detect the moving object.

According to another aspect, there is provided at least one computer readable medium storing computer readable instructions to implement methods of embodiments.

BRIEF DESCRIPTION OF THE DRAWINGS

These and/or other aspects, features, and advantages will become apparent and more readily appreciated from the following description of exemplary embodiments, taken in conjunction with the accompanying drawings of which:

FIG. 1B is a view showing a shape for producing a light source on an obstacle and a camera image obtained by a camera sensor in order to obtain a structured light image according to an exemplary embodiment.

DETAILED DESCRIPTION OF EMBODIMENTS

Figure 1A:
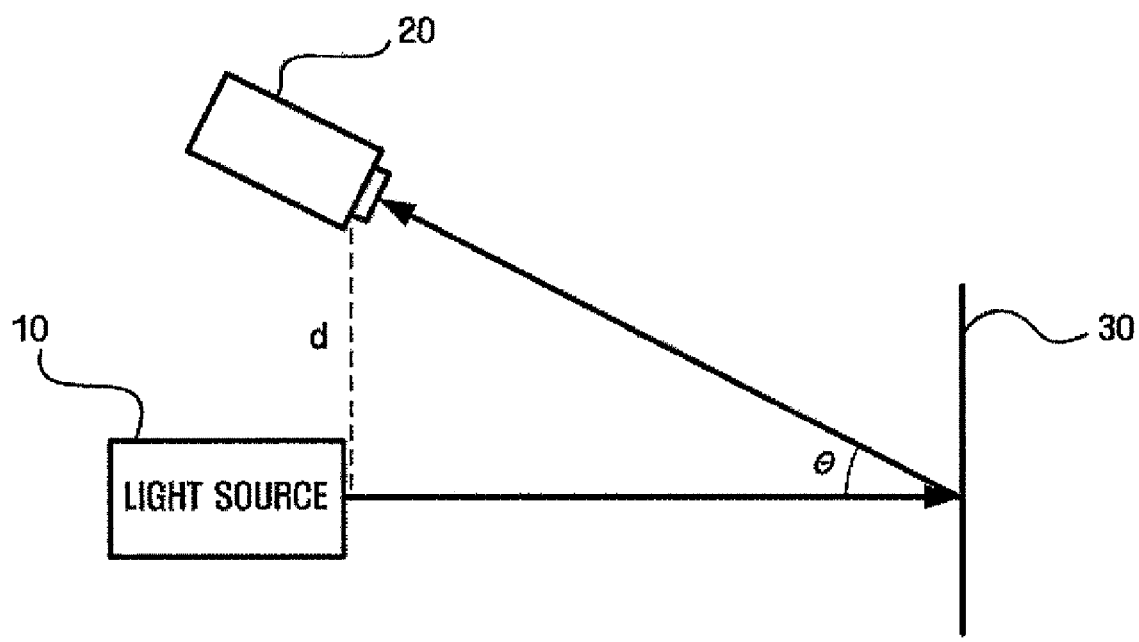
FIG. 1A is a side view showing an apparatus and a method of obtaining a structured light image according to an exemplary embodiment.

Reference will now be made in detail to exemplary embodiments, examples of which are illustrated in the accompanying drawings, wherein like reference numerals refer to the like elements throughout. Exemplary embodiments are described below by referring to the figures.

Hereinafter, a system for detecting a moving object using a structured light, a method and medium for detecting the same, and a mobile robot including a system according to an exemplary embodiment will be described with reference to the accompanying drawings.

First, an apparatus and a method for obtaining an image data by using a structured light will be described.

FIG. 1A is a side view showing an apparatus and a method of obtaining a structured light image according to an exemplary embodiment, and FIG. 1B is a view showing a shape for producing a light source 10 on an obstacle 30 and a camera image 40 obtained by a camera sensor 20 in order to obtain a structured light image according to an exemplary embodiment. The obstacle 30 may be capable of movement, for example a moving object.

An exemplary embodiment may illuminate light on the obstacle 30 by using an active light source 10 such as a laser and obtain image information reflected from the obstacle 30 by using a sensor 20 such as a camera. At this time, the camera sensor 20 is disposed in relationship to the light source 10 to maintain a constant distance d from the light source 10 and to obtain the image information. Preferably, the light source 10 may use a near-infrared laser beam. By using the near-infrared laser beam, it may obtain image information even if lighting is absent.

Referring to FIG. 1B, the laser beam is illuminated in a plane on the obstacle 30 from the light source 10 while having a constant visual angle α. The B of FIG. 1B indicates a camera image 40 of a line profile shape which the camera sensor 20 obtains. In the A of FIG. 1B, light reflected from point "a" and "b" of the obstacle 30 indicate "a" and "b" of the camera image 40, respectively, and a Y-axis direction indicates the distance between the camera sensor 20 and the obstacle 30.

A distance data between the light source 10 and the obstacle 30 may be calculated by a triangular method on the basis of the distance between the camera sensor 20 and the obstacle 30 obtained from the coordinates of the camera image 40, an angle θ of the camera sensor 20 that is inclined toward the obstacle 30, and the distance d between the camera sensor 20 and the light source 10. Since the triangular method is known to those skilled in the art, the detailed description thereof is omitted.

A process for detecting a moving object by calculating the distance data between the light source 10 and the obstacle 30 from the camera image 40 obtained by the camera sensor 20 will be described.

Figure 2:
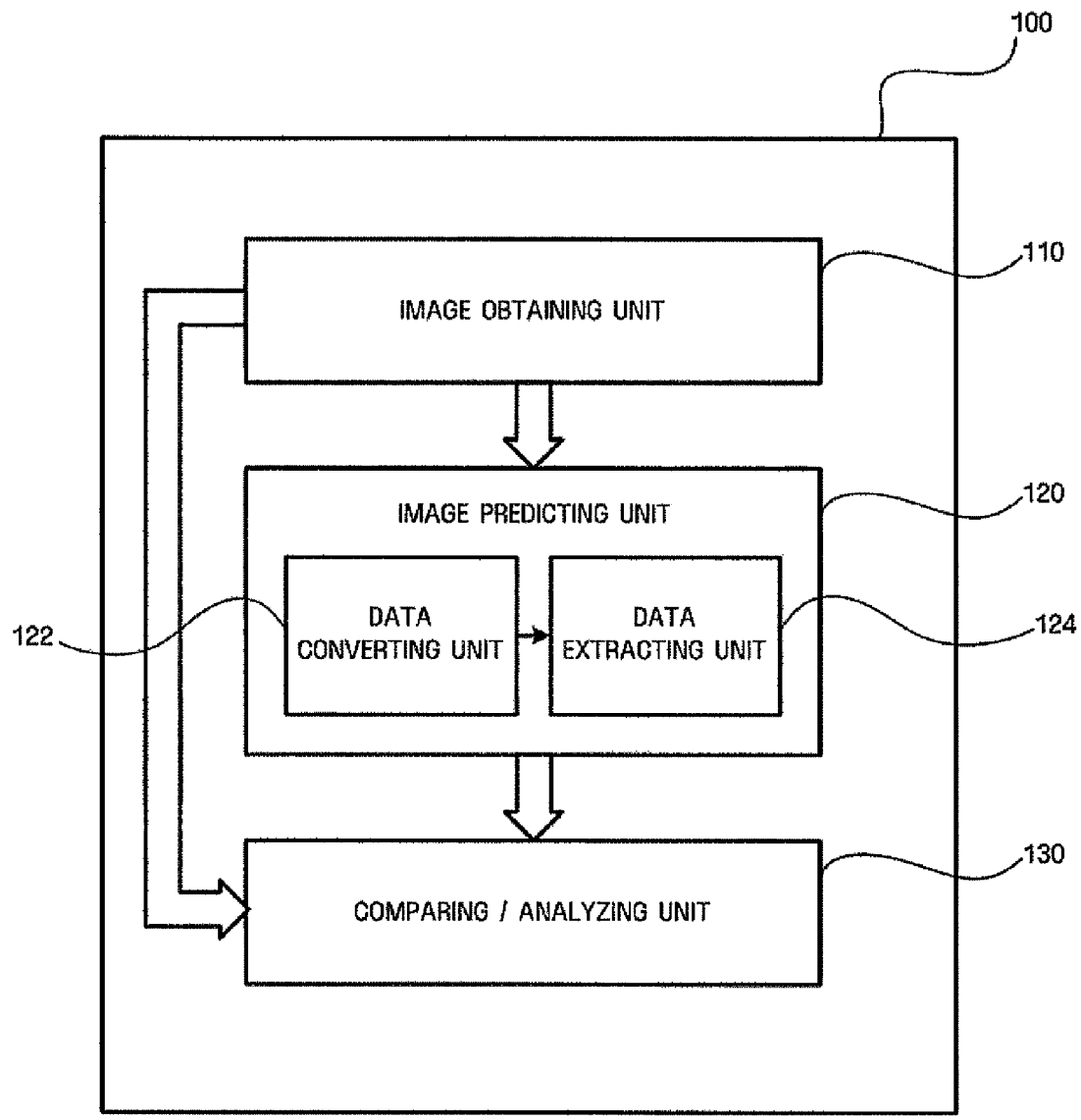
FIG. 2 is a block diagram of a system of detecting a moving object using a structured light according to an exemplary embodiment.

FIG. 2 is a block diagram of a system of detecting a moving object using a structured light according to an exemplary embodiment.

The system 100 for detecting a moving object includes an image obtaining (capturing) unit 110 that obtains (captures) the image information of the obstacle 30, an image predicting unit 120 that predicts the image information obtained by the image obtaining unit 110 and an image at a moved position from the moving information of the system 100, and a comparing/analyzing unit 130 that compares and analyzes the obtained image and the predicted image.

The image predicting unit 120 may include a data converting unit 122 that converts the distance calculated from the image information into the distance data predicted from the moving information of the system 100 and a data extracting unit 124 that extracts the data deviated from the visual angle α of the light source 10 from the predicted distance data after the system 100 is moved.

An exemplary embodiment may obtain a first image by using the light source 10 in the image obtaining unit 110 and calculate the distance data between the light source 10 and the obstacle 30 by the triangular method as described above. On the basis of the distance data of the first image and the moving information (moving vector and rotational angle) of the system 100 after obtaining the first image, the distance data of a second image that is an image at the moved position may be predicted by calculation through the data converting unit 122 and the data extracting unit 124 in the image predicting unit 120. The second image may be obtained (captured) by using the light source 10 in the image obtaining unit 110. Accordingly, it may detect the moving object by comparing the distance data calculated from the second image and the distance data of the predicted second image in the comparing/analyzing unit 130.

Figure 3:
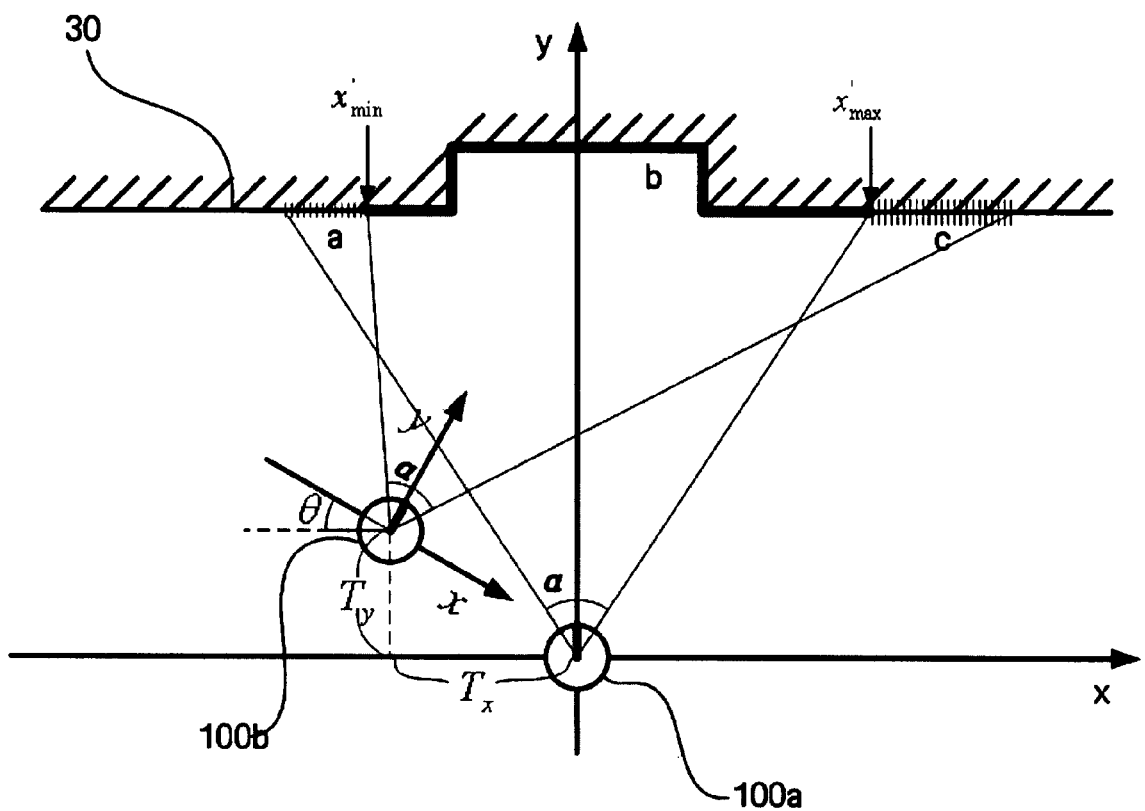
FIG. 3 is a view explaining a process for detecting a moving object after obtaining a first image and a second image after a movement according to an exemplary embodiment.

FIG. 3 is a view illustrating a process of detecting a moving object after obtaining a first image and a second image after a movement.

First, as described above, a first image is obtained in the image obtaining unit 110 by receiving a structured light that is horizontally illuminated from a system 100a and reflected through the camera sensor 20. The obtained camera image 40 is converted into the distance data by the above-described triangular method. The distance data is the data in which "a region" of a dotted line and "b region" a bolded straight line in FIG. 3 are indicated by a coordinate system. At this time, for convenience of the description, the light source 10 at which the system 100a is located is defined as an origin, an x-axis is defined as a data axis, and a y-axis is defined as a distance axis indicating a distance from the light source 10 to the obstacle 30. The x-axis includes a negative x-axis that is a left side of the origin and a positive x-axis that is a right side of the origin. If the distance data is represented as an "A", it may be expressed as follows.

$$A \equiv \begin{bmatrix} x_1 & x_2 & \cdots & x_{n-1} & x_n \\ y_1 & y_2 & \cdots & y_{n-1} & y_n \end{bmatrix} \equiv \begin{bmatrix} X \\ Y \end{bmatrix} \equiv \lfloor A_1 \quad A_2 \quad \cdots \quad A_{n-1} \quad A_n \rfloor$$

where, subscripts 1, 2, . . . , n indicate n distance data obtained from the structured light, and $x_n$ and $y_n$ indicate coordinate values of each distance data.

After the image obtaining unit 110 obtains the first image information, the system 100a continuously moves. Hereinafter, a process of predicting the distance data of the second image, which is the image at the position after the system 100a is moved during a predetermined time, in the image predicting unit 120 will be described.

After the image obtaining unit 110 obtains the first image, the system 100b each moves by $T_x$ and $T_y$ in an x direction and a y direction and rotates by θ angle. A moving distance and a rotational angle may be calculated from an encoder of the system 100b, a gyro, a dead reckoning system or the like. Therefore, assuming a moving vector T and a rotational matrix R as follow, a data converting unit 122 may convert the distance data A into a predicted distance data A' after the system is moved from following equation 1.

$$T = \lfloor T_x \quad T_y \rfloor, \text{ and } R = \begin{bmatrix} \cos(\theta) & \sin(\theta) \\ -\sin(\theta) & \cos(\theta) \end{bmatrix}$$

The distance data A' may be expressed as a follows;

$$A' \equiv \begin{bmatrix} x'_1 & x'_2 & \cdots & x'_{n-1} & x'_n \\ y'_1 & y'_2 & \cdots & y'_{n-1} & y'_n \end{bmatrix} \equiv \begin{bmatrix} X' \\ Y' \end{bmatrix} \equiv \lfloor A'_1 \quad A'_2 \quad \cdots \quad A'_{n-1} \quad A'_n \rfloor$$

where, $x'_n$ and $y'_n$ are coordinate values on the basis of the coordinate system of the position after the system is moved. At this time, the predicted distance data A' are data converted on the basis of the x'-y' coordinate system.

$A'=R(A-T)$ [Equation 1]

However, the equation 1 is applied when the rotational axis of the system 100 and the position of the camera sensor 20 are equal. Generally, it should be considered that the rotational axis of the system 100 and the position of the camera sensor 20 are not equal. Assuming a distance vector T1 between the rotational axis of the system 100 and the camera sensor 20 as a follows, the equation 1 may be transformed into the following equation 2.

$A'=R(A-T-T1)+T1$ [Equation 2]

A detecting area of the first image information and a detecting area of the second image information are varied by the movement and the rotation of the system 100. The reason is that the visual angle α of the light source 10 is constant, while the position and the angle of the system 100 are changed. Accordingly, the data extracting unit 124 extracts the data of the common region (b region) of the predicted distance data A' (a region and b region) converted in the data converting unit 122 and the distance data (b region and c region) within the visual angle a of the second image at the position after the system is moved.

That is, the data extracting unit 124 extracts the data that deviates from the visual angle α of the system 100b after the movement of the system 100a out of the predicted distance data A' of the position after the movement, which are converted in the data converting unit 122. Expressing this as a formula, the predicted data is represented as a follow;

$$\text{if, } |\arctan(y'_n, x'_n)| \geq \frac{a}{2}, \text{ then } A'_n = 0$$

Therefore, the data of A is extracted from the predicted data. Finally, the distance data of the second image, which is predicted in the image predicting unit 120, are the data of the b region illustrated by the x and y coordinate system.

Next, the second image predicted in the image predicting unit 120 will be compared with the second image obtained in the image obtaining unit 110. The second image is obtained in the image obtaining unit 110 of the system 100b by receiving a structured light that is horizontally illuminated from a system 100b and reflected through the camera sensor 20. In addition, the obtained camera image 40 is converted into the distance data by the above-described triangular method.

At this time, the distance data of the second region predicted in the image predicting unit 120 is the distance data of the b region and the distance data of the obtained second image is the data of the b region and the c region. Each data is the data on the basis of the x'-y' coordinate system. Accordingly, the comparing region should be limited to the b region out of the distance data calculated from the second image that is obtained in the image obtaining unit 110.

A minimum value x'min and a maximum value x'max of x' may be calculated from the predicted second image of the distance data. The minimum value is the boundary of the "a" region and the "b" region, and the maximum value is the boundary of the "b" region and the "c" region. Therefore, it may detect the moving object by comparing the distance data (b region) between the $x'_{min}$ and the $x'_{max}$ out of the distance data obtained from the second image with the finally predicted distance data (b region) through the data converting unit 122 and the data extracting unit 124 of the image predicting unit 120.

When comparing the distance data of the predicted second image with the distance data of the second image, if the moving object does not exist, then both the distance data of the predicted second image and the distance data of the second image will have an approximately equal value. Furthermore, if the moving object exists, a part of both values of the distance data of the predicted second image and the distance data of the second image may be largely changed. At this time, the moving object may be an intruder in a constant region and/or may be a moving animal.

The distance data of the predicted second image and the distance data of the second image are compared by the related art split-merge method that extracts corner points on the basis of a distance threshold in proportion to the distance data corresponding to pixel information of the structured light image, generates the straight line that joints together the corner points, and compares each segment of lines. It may detect the moving object by the split-merge method. This will be described with reference to drawings below.

An example for detecting the moving object in the comparing/analyzing unit 130 by comparing and analyzing the distance data of the second image obtained in the image obtaining unit 110 and the distance data of the second image predicted in the image predicting unit 120 will be described.

Figure 4A:
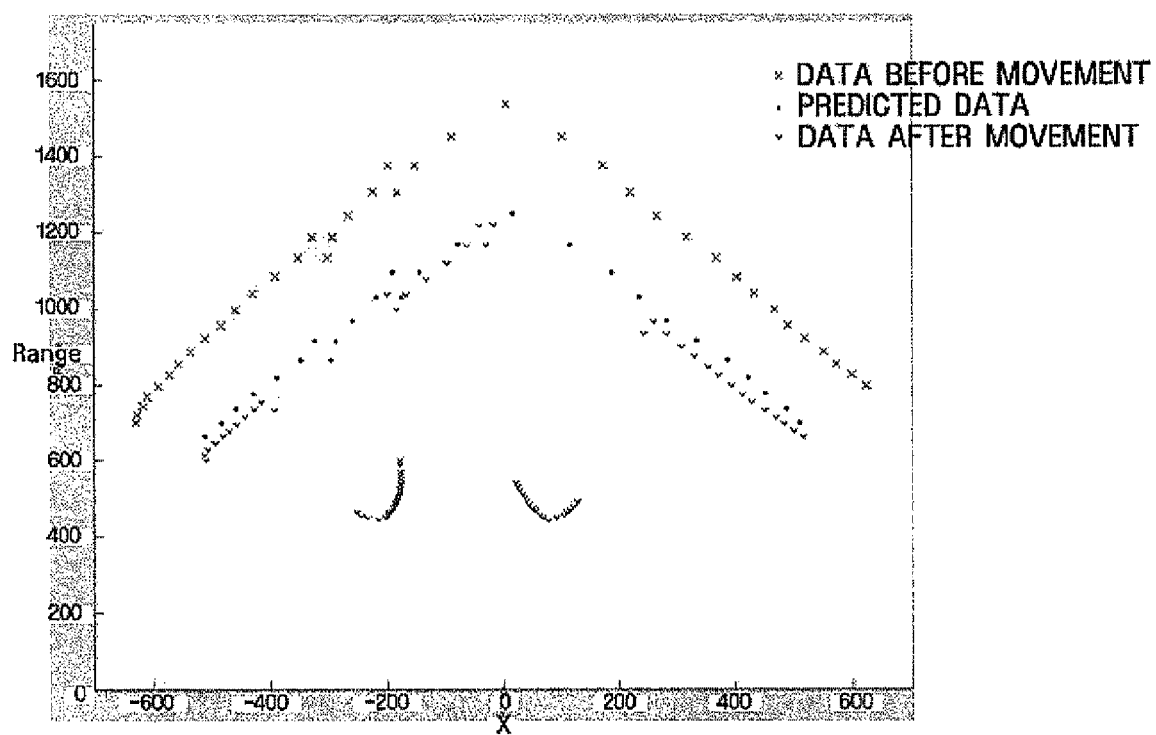
FIG. 4A is a view showing an example for detecting a moving object (intruder) from a distance data of a predicted second image and a distance data of an obtained second image.
Figure 4B:
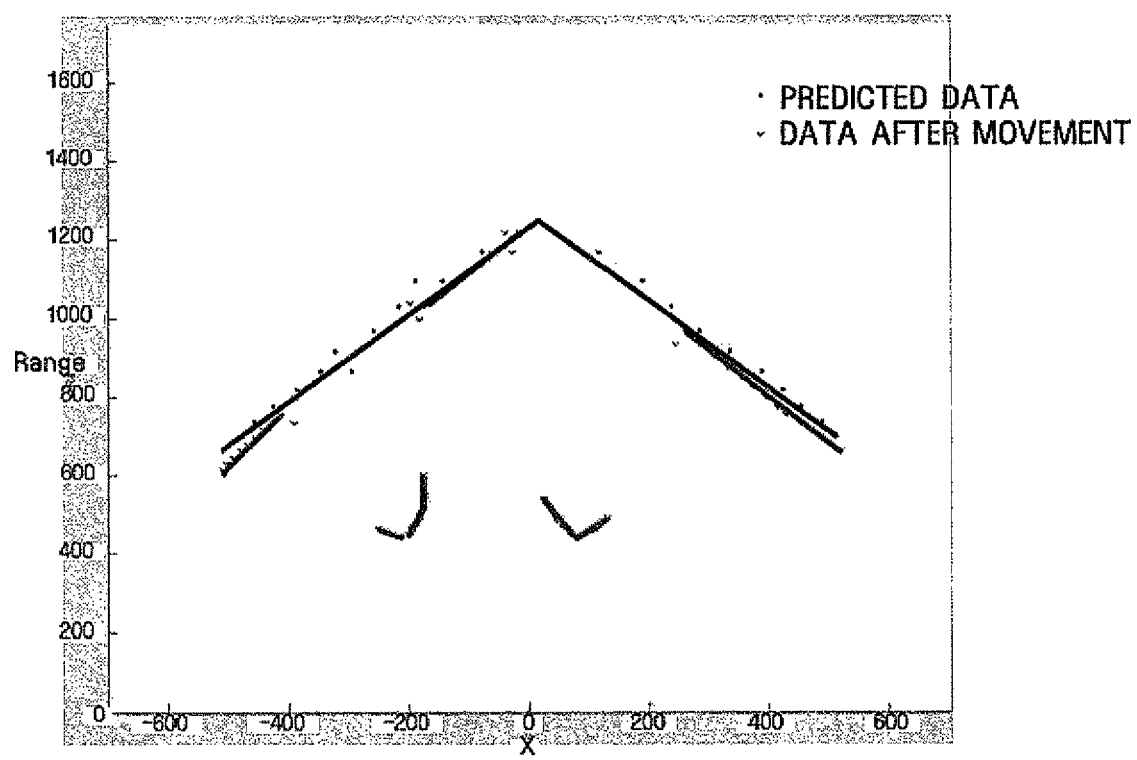
FIG. 4B is a view showing a straight line joining together by extracting corner points so as to compare a distance data of an obtained second image with a distance data of a predicted second image.

FIG. 4A is a view showing an example for detecting a moving object (e.g., intruder) from a distance data of a predicted second image and a distance data of an obtained second image, and FIG. 4B is a view showing a straight line joined together by extracting corner points so as to compare a distance data of an obtained second image with a distance data of a predicted second image.

FIG. 4A shows the distance data when the intruder appears in the second image after the system advances in 300 mm, while the intruder does not exist in the first image. Referring to FIG. 4A, all of the distance data (the distance data of the obtained first image) before the movement do not change into the predicted distance data (the distance data of the predicted second image), but the only data within the range of the visual angle α of the system 100 after the movement is extracted. The predicted data of the second image does not appear in −600~−500 and 500~600 in the x-axis range as compared with the distance data of the first image. The data after the movement is in the shape of two legs that break between the two legs as compared with the predicted data. Thus, when the difference thereof is large by comparing the predicted data with the data after the movement, the comparing/analyzing unit 130 determines that it detects the moving object (intruder). Accordingly, the system 100 may sound the alarm to inform the user, or take follow-up measures such as an actuation of the security apparatus. Referring to FIG. 5B, it may compare both distance data by extracting a corner point from the respective data, generating the straight lines, and comparing the generated straight lines with each other by the above-mentioned method in the related art.

If the system 100 detects the moving object, it takes follow-up measures described above. However, when determined that there is no large difference by comparing the second distance data predicted in the comparing/analyzing unit 130 with the second distance data obtained, the system obtains the first image as well as the above method, and repeats the above process. Preferably, it may repeat the above process by treating the obtained second image as the first image.

Figure 5A:
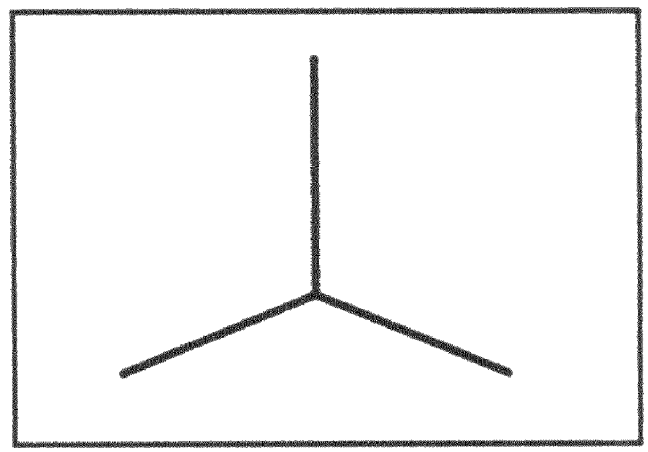
FIG. 5A is a view showing a first structured light image when an intruder appears and a second structured light image after a system advances 300 mm when the intruder moves.
Figure 5A:
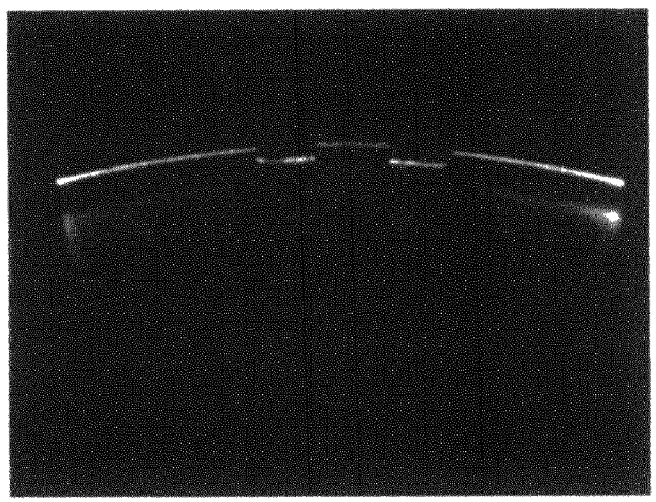
Figure 5A:
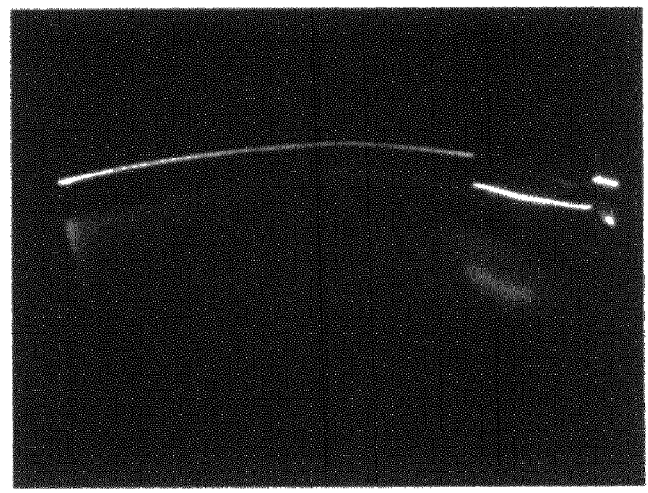
Figure 5B:
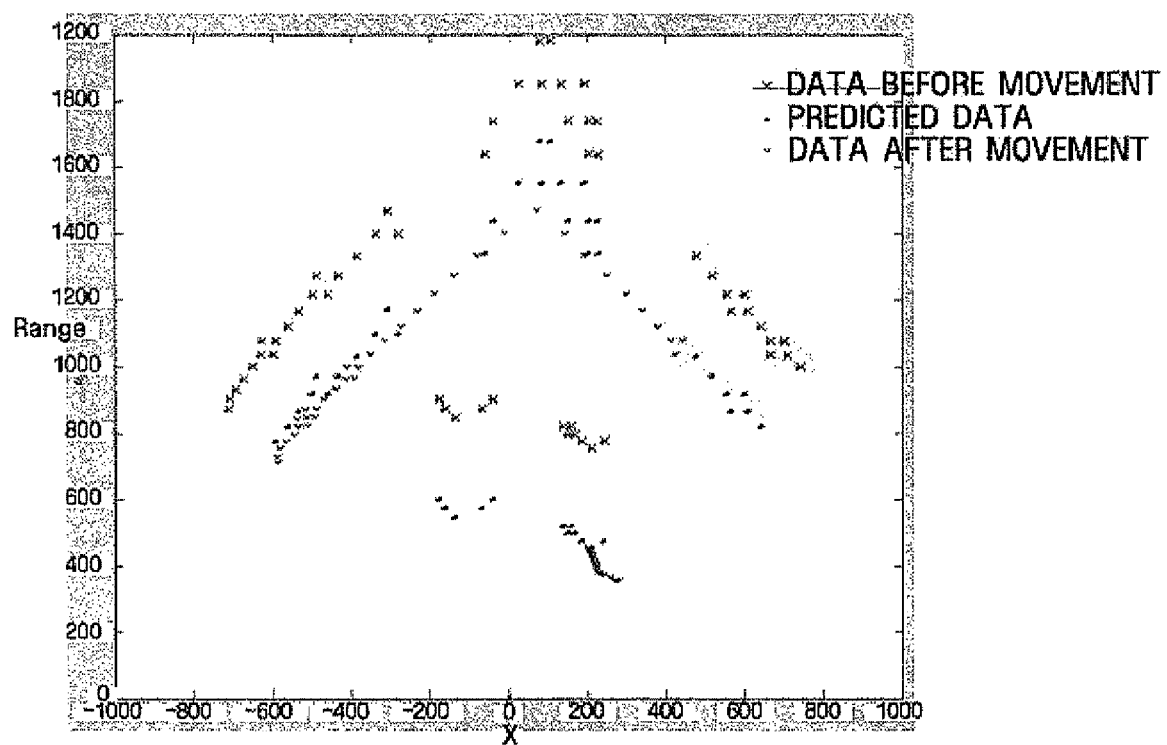
FIG. 5B is a view showing an example for detecting a moving object by using the structured light image of FIG. 5A according to an exemplary embodiment.

FIG. 5A is a view showing a first structured light image when an intruder appears and a second structured light image after a system 100 advances in 300 mm when the intruder moves. FIG. 5B is a view showing one for detecting a moving object by using the structured light image of FIG. 5A according to an exemplary embodiment.

The first structured image of FIG. 5A is one that photographs a corner of a wall. In FIG. 5A, a two-piece image, which breaks in the middle of the structured light image and shortly appears below, shows the legs of the intruder. Since the system 100 advances in 300 mm, the second structured light image looks like an enlarged picture of the first image and shows only one leg. Referring to FIG. 5B, since the system 100 advances in 300 mm, the predicted data (distance data of the predicted second image) is to advance the distance data (data before the movement) obtained from the first image by a constant distance. All the data of the first image does not advance, but data of both sides are extracted due to the visual angle α after the movement. When comparing the predicted data with the data (distance data of the obtained second image) after the movement, a part showing the wall is similar. However, the predicted data and the data after the movement are significantly different in that the data after the movement has the shape of which the only one piece (one leg) of images breaks. Therefore, the comparing/analyzing unit 130 of the system 100 may determine that it detects the moving object.

Figure 6A:
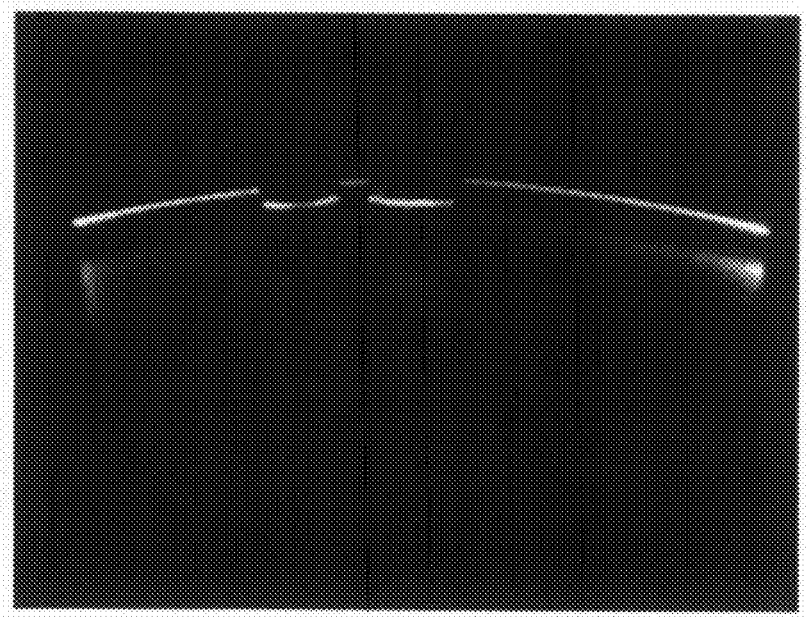
FIG. 6A is a view showing a first structured light image when an intruder appears and a second structured light image after a system rotates at 20 degrees in a clockwise direction.
Figure 6A:
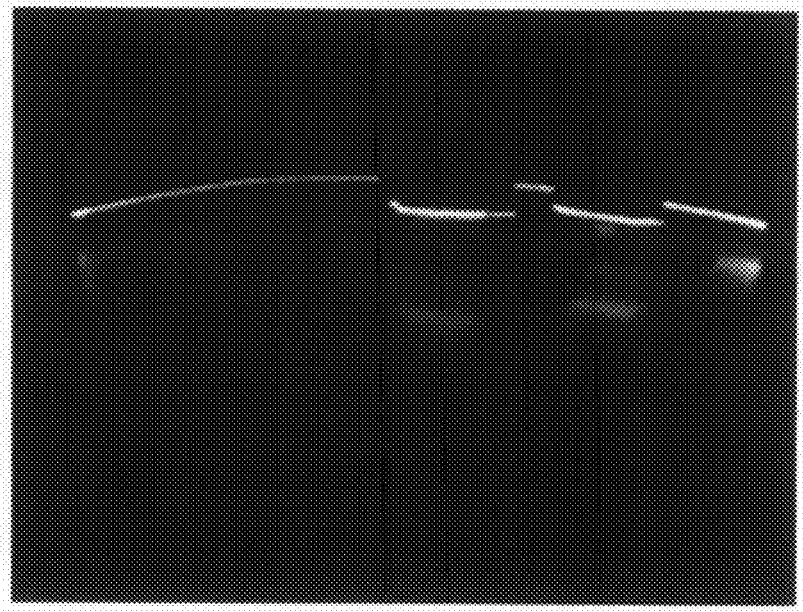
Figure 6B:
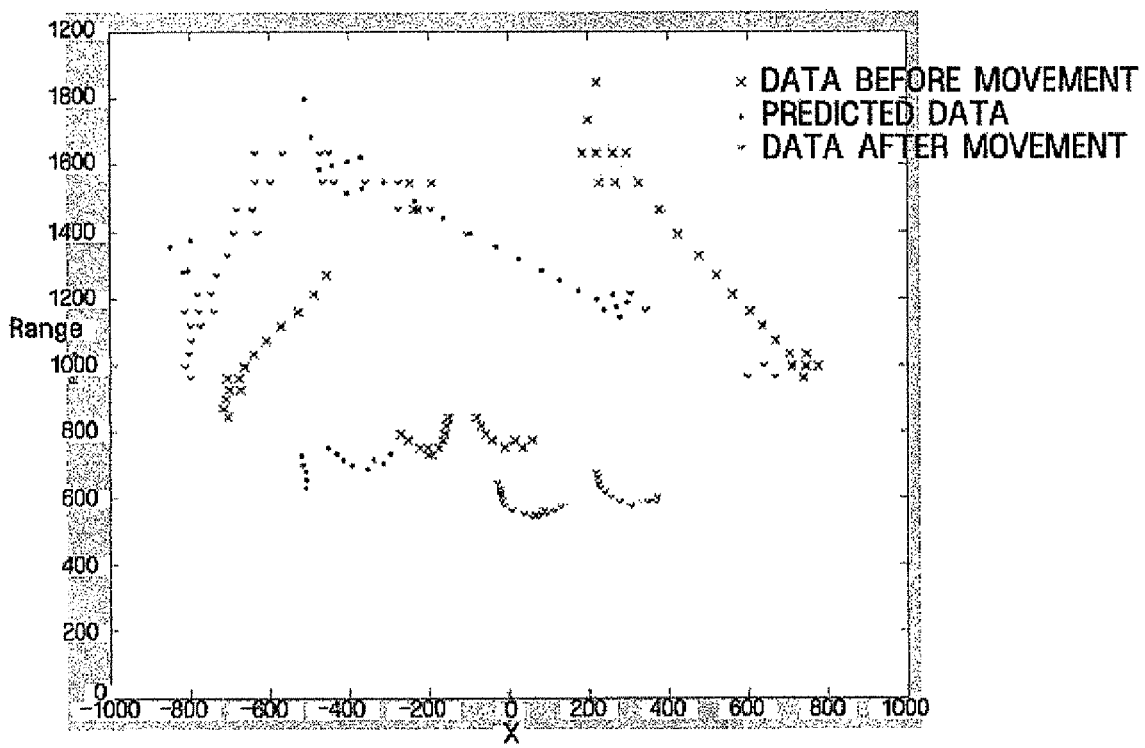
FIG. 6B is a view showing an example for detecting a moving object by using the structured light image of FIG. 6A according to an exemplary embodiment.

FIG. 6A is a view showing a first structured light image when an intruder appears and a second structured light image after a system 100 rotates at 20 degrees in a clockwise direction. FIG. 6B is a view showing an example for detecting a moving object by using the structured light image of FIG. 6A according to an exemplary embodiment.

Like FIG. 5A, two-piece image, which breaks in the middle of the structured light image and shortly appears below, shows the legs of the intruder. Referring to FIG. 6B, since the system 100 rotates at 20 degrees, the predicted data (distance data of the predicted second image) is the distance data (distance data before the movement) obtained from the first image by 20 degrees in a counterclockwise direction. It may know that all the data of the first image does not shift, but data of the left wall are extracted due to the visual angle α after the movement. When comparing and analyzing the predicted distance data with the distance data after the movement, a part showing the stationary wall is similar, but the position difference of the data showing by the legs of the intruder. In the data showing the leg, since the data after the movement are formed at a right of the predicted data, it may know that the intruder moves into the right in sight of the system 100. Therefore, the comparing/analyzing unit 130 of the system 100 may determine that it detects the moving object.

Figure 7A:
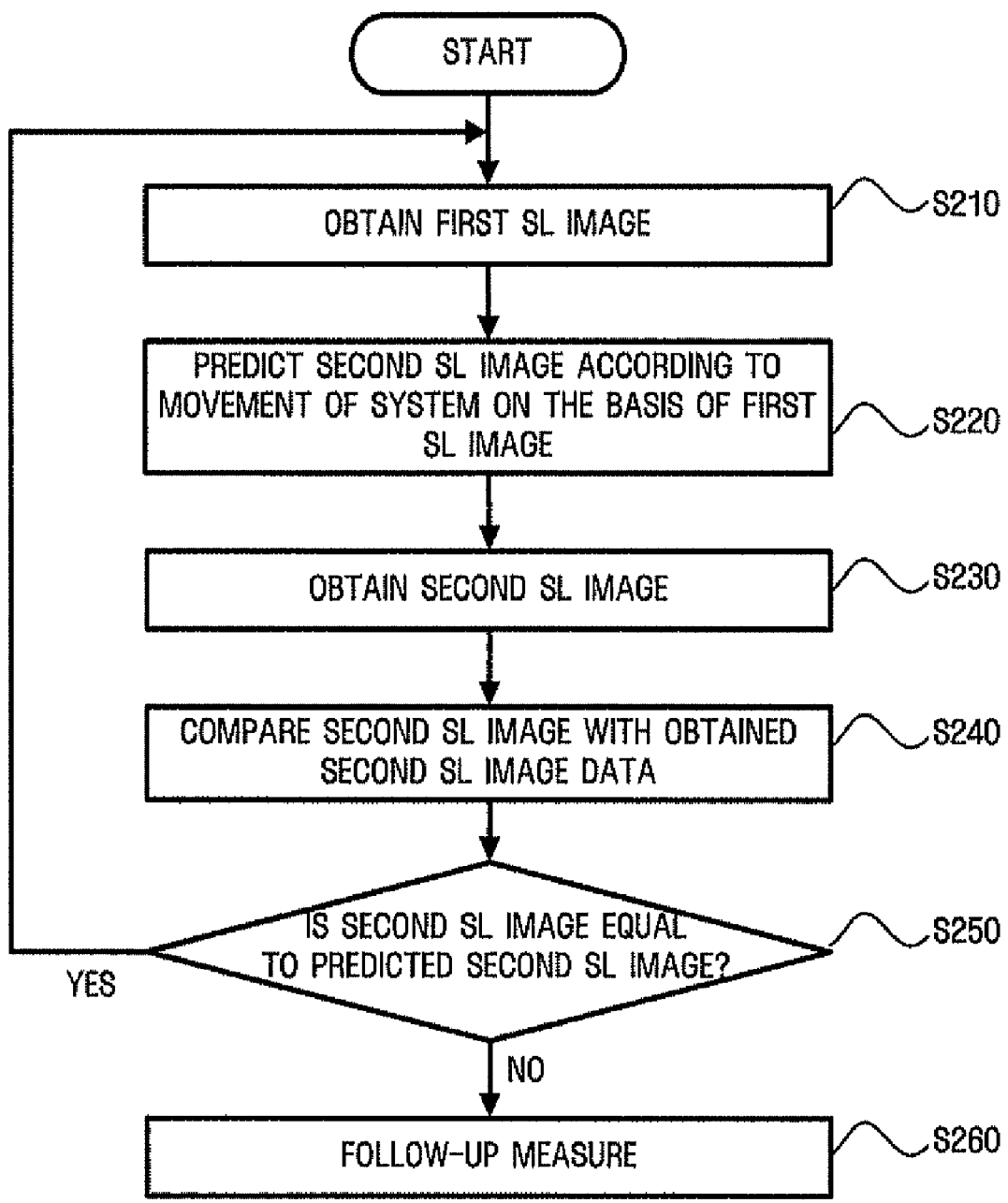
FIG. 7A is a flowchart showing a method of detecting a moving object using a structured light according to an exemplary embodiment.
Figure 7B:
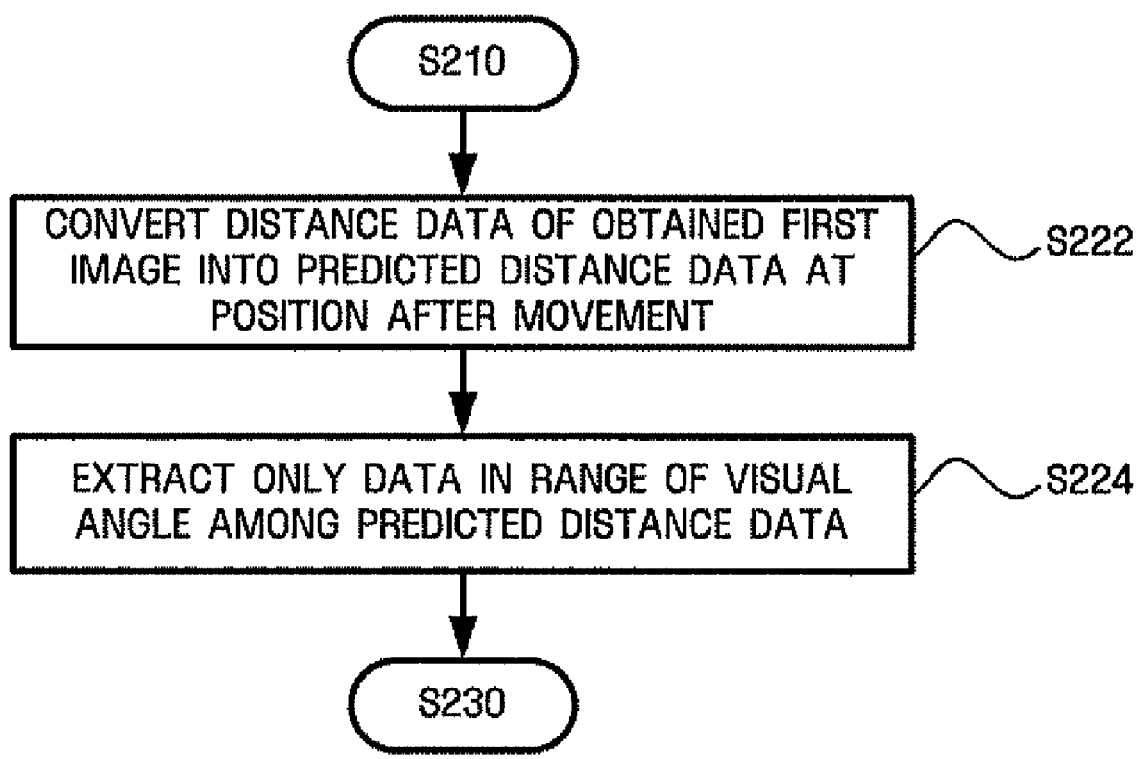
FIG. 7B is a detailed flowchart of step (S220) predicting the second image of FIG. 7A according to an exemplary embodiment.

FIG. 7A is a flowchart showing a method of detecting a moving object using a structured light according to an exemplary embodiment, and FIG. 7B is a detailed flowchart of step (S220) predicting the second image of FIG. 7A according to an exemplary embodiment.

A method for detecting the moving object using the structured light according to an exemplary embodiment includes obtaining (S210) a first image of the obstacle 30 in an image obtaining unit 110, predicting (S220) a second image from the first image a moving information (moving vector and rotational angle) in an image predicting unit 120, obtaining (S230) the second image in the image obtaining unit 110, and comparing (S240) the predicted second image with the obtained second image in a comparing/analyzing unit 130.

If determining (S250) in the comparing/analyzing unit 130 that the predicted image and the obtained image are equal to each other, the first image is obtained again, and the above steps are repeated. Preferably, the obtained second image is similar to the following first image. If determining (S250) that the predicted image and the obtained image are different from each other, the system may sound the alarm to inform the user, or take follow-up measures such as an actuation of the security system (S260).

Step (S220) predicting the second image may include converting (S222) the distance data calculated from the first image information into the predicted distance data after the movement from the moving information (moving vector and rotational angle) in a data converting unit 122 and extracting (S224) only the data in the range of the visual angle α after the movement among the predicted distance data after the movement in a data extracting unit 124.

If the above system of detecting the moving object is mounted on the mobile robot having the driving system which performs the traveling by calculating the position by itself without human control and recognizing the obstacle 30, the mobile robot may be used as a security robot for surveying the intruder while moving.

In addition to the above-described exemplary embodiments, exemplary embodiments can also be implemented by executing computer readable code/instructions in/on a medium/media, e.g., a computer readable medium/media. The medium/media can correspond to any medium/media permitting the storing of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), and hardware storage devices (e.g., read only memory media, random access memory media, flash memories, etc.). The medium/media may also be a distributed network, so that the computer readable code/instructions are stored and executed in a distributed fashion. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The terms "module", as used herein, denotes, but are not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software components, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processors.

The computer readable code/instructions and computer readable medium/media may be those specially designed and constructed for the purposes of embodiments, or they may be of the kind well-known and available to those skilled in the art of computer hardware and/or computer software.

According to system, method, and medium of detecting the moving object using structured light, and a mobile robot including the system, at least one of the following effects may be obtained.

First, it is possible to detect the moving object when the system is fixed or when it is movable.

Second, since it is possible to detect the moving object while moving, a blind area does not exist, such that it may detect a larger area.

Third, it is possible to detect the moving object by using the structured light even when lighting entirely does not exists.

Although a few exemplary embodiments have been shown and described, it would be appreciated by those skilled in the art that changes may be made in these exemplary embodiments without departing from the principles and spirit of embodiments, the scope of which is defined in the claims and their equivalents.

What is claimed is:

1. A system for detecting a moving object, the system comprising:
   an image obtaining unit to obtain a first image of an obstacle at a predetermined position and a second image of the obstacle at a position after a movement of the system by using a light source;
   an image predicting unit to predict the second image at the position after the movement of the system by using the first image and information pertaining to the movement of the system; and
   a comparing/analyzing unit to compare and analyze the second image obtained by the image obtaining unit and the second image predicted by the image predicting unit to detect the moving object using at least one processor,
   wherein the image obtaining unit obtains first and second images of the obstacle by receiving the light source, which is generated in a plane and reflected from the obstacle, through a single camera sensor,
   wherein the image obtaining unit obtains a distance data between the light source and the obstacle at the positions at which the first image and the second image are obtained, and
   wherein the comparing/analyzing unit compares and analyzes a distance data at the position at which the second image is obtained by the image obtaining unit and a distance data of the predicted second image.

2. The system of claim 1, wherein the light source comprises a near-infrared laser beam.

3. The system of claim 1, wherein:
   a moving vector T indicating a movement of the system after the first image is obtained, a rotational matrix R from a rotational angle $\theta$ of the system after the first image is obtained, and a distance vector T1 between the single camera sensor and the rotational axis of the system are represented as follows:

$$T = \lfloor T_x \quad T_y \rfloor,$$

$$R = \begin{bmatrix} \cos(\theta) & \sin(\theta) \\ -\sin(\theta) & \cos(\theta) \end{bmatrix}, \text{ and}$$

$$T1 = \lfloor T_{x1} \quad T_{y1} \rfloor;$$

the light source is defined as an origin, an x-axis is defined as a data axis having a negative that is a left side of the origin and a positive that is a right side of the origin, and a y-axis is defined as a distance axis, a distance data A calculated from the obtained first image and a distance data A' that is predicted after the movement of the system are represented as follows:

$$A \equiv \begin{bmatrix} x_1 & x_2 & \cdots & x_{n-1} & x_n \\ y_1 & y_2 & \cdots & y_{n-1} & y_n \end{bmatrix} \equiv \begin{bmatrix} X \\ Y \end{bmatrix} \equiv \lfloor A_1 \quad A_2 \quad \cdots \quad A_{n-1} \quad A_n \rfloor,$$

$$A' \equiv \begin{bmatrix} x'_1 & x'_2 & \cdots & x'_{n-1} & x'_n \\ y'_1 & y'_2 & \cdots & y'_{n-1} & y'_n \end{bmatrix} \equiv \begin{bmatrix} X' \\ Y' \end{bmatrix} \equiv \lfloor A'_1 \quad A'_2 \quad \cdots \quad A'_{n-1} \quad A'_n \rfloor;$$

and
the image predicting unit comprises a data converting unit to convert the distance data A calculated from the first image into the predicted distance data A' by using an equation A'=R(A−T−T1)+T1, and a data extracting unit to extract the predicted distance data A' calculated in the data converting unit by using a predetermined algorithm.

4. The system of claim 3, wherein the predetermined algorithm satisfies a following condition when representing a visual angle of the light source as an α:

$$\text{if, } |\arctan(y'_n, x'_n)| \geq \frac{a}{2}, \text{ then } A'_n = 0.$$

5. The system of claim 4, wherein the distance data calculated from the obtained image is a distance data from the light source to the obstacle calculated by applying a triangular method to a coordinate value of the obtained image.

6. The system of claim 3, wherein when a maximum value and a minimum value in a vector X' of the predicted distance data A' extracted by the data extracting unit are indicated as $x'_{max}$ and $x'_{min}$, respectively, the comparing/analyzing unit compares the distance data between $x'_{max}$ and $x'_{min}$ in the distance data calculated from the obtained second image with the predicted distance data extracted by the data extracting unit.

7. The system of 6, wherein the distance data calculated from the obtained image is a distance data from the light source to the obstacle calculated by applying a triangular method to a coordinate value of the obtained image.

8. The system of claim 3, wherein the distance data calculated from the obtained image is a distance data from the light source to the obstacle calculated by applying a triangular method to a coordinate value of the obtained image.

9. A method for detecting a moving object, the method comprising:
obtaining a first image of an obstacle at a predetermined position by using a light source;
predicting a second image of the obstacle at a position after the movement of the system by using the first image and information pertaining to the movement of the system;
obtaining the second image at the position after the movement of the system; and
comparing the predicted second image with the obtained second image to detect the moving object using at least one processor,
wherein an image obtaining unit obtains first and second images of the obstacle by receiving the light source, which is generated in a plane and reflected from the obstacle, through a single camera sensor,
wherein said obtaining a first image includes obtaining a distance data between the light source and the obstacle at the position at which the first image is obtained and said obtaining the second image includes obtaining a distance data between the light source and the obstacle at the position at which the second image is obtained, and
wherein said comparing includes comparing a distance data at the position at which the second image is obtained with a distance data of the predicted second image.

10. The method of claim 9, wherein the light source comprises a near-infrared laser beam.

11. The method of claim 9, wherein:
a moving vector T indicating a movement of the system after the first image is obtained, a rotational matrix R from a rotational angle θ of the system after the first image is obtained, and a distance vector T1 between the single camera sensor and the rotational axis of the system are represented as follows:

$$T = \lfloor T_x \quad T_y \rfloor,$$

$$R = \begin{bmatrix} \cos(\theta) & \sin(\theta) \\ -\sin(\theta) & \cos(\theta) \end{bmatrix}, \text{ and}$$

$$T1 = \lfloor T_{x1} \quad T_{y1} \rfloor;$$

the light source is defined as an origin, an x-axis is defined as a data axis having a negative that is a left side of the origin and a positive that is a right side of the origin, and a y-axis is defined as a distance axis, a distance data A calculated from the obtained first image and a distance data A' that is predicted after the movement of the system are represented as follows:

$$A \equiv \begin{bmatrix} x_1 & x_2 & \cdots & x_{n-1} & x_n \\ y_1 & y_2 & \cdots & y_{n-1} & y_n \end{bmatrix} \equiv \begin{bmatrix} X \\ Y \end{bmatrix} \equiv \lfloor A_1 \quad A_2 \quad \cdots \quad A_{n-1} \quad A_n \rfloor$$

$$A' \equiv \begin{bmatrix} x'_1 & x'_2 & \cdots & x'_{n-1} & x'_n \\ y'_1 & y'_2 & \cdots & y'_{n-1} & y'_n \end{bmatrix} \equiv \begin{bmatrix} X' \\ Y' \end{bmatrix} \equiv \lfloor A'_1 \quad A'_2 \quad \cdots \quad A'_{n-1} \quad A'_n \rfloor;$$

and
the predicting a second image comprises converting the distance data A calculated from the first image into the predicted distance data A' by using an equation A'=R(A−T−T1)+T1, and extracting the predicted distance data A' calculated in the converting the distance data A by using a predetermined algorithm.

12. The method of claim 11, wherein the predetermined algorithm satisfies a following condition when representing a visual angle of the light source as an α:

$$\text{if, } |\arctan(y'_n, x'_n)| \geq \frac{a}{2}, \text{ then } A'_n = 0.$$

13. The method of 12, wherein the distance data calculated from the obtained image is a distance data from the light source to the obstacle calculated by applying a triangular method to a coordinate value of the obtained image.

14. The method of claim 11, wherein when a maximum value and a minimum value in a vector X' of the predicted distance data extracted in the extracting the predicted distance data A(are indicated as x(max and x(min, respectively, in the comparing the second image predicted in the predicting a second image with the second image obtained in the obtaining the second image and detecting the moving object, the distance data between x(max and x(min in the distance data calculated from the obtained second image is compared with the predicted distance data extracted in the extracting the predicted distance data A'.

15. The method of claim 14, wherein the distance data calculated from the obtained image is a distance data from the light source to the obstacle calculated by applying a triangular method to a coordinate value of the obtained image.

16. The method of claim 11, wherein the distance data calculated from the obtained image is a distance data from the light source to the obstacle calculated by applying a triangular method to a coordinate value of the obtained image.

17. At least one non-transitory computer readable medium storing computer readable instructions that control at least one processor to implement the method of claim 9.

18. A mobile robot for detecting a moving object, the robot comprising:

a system to detect a moving object; and
a driving system to drive the mobile robot which calculates position and recognizes the moving object,
wherein the system to detect the moving object includes:
an image obtaining unit to obtain a first image of the object at a predetermined position and a second image of the object at a position after a movement of the system by a light source;
an image predicting unit to predict the second image at the position after the movement of the system by using the first image and information pertaining to the movement of the system; and
a comparing/analyzing unit to compare and analyze the second image obtained by the image obtaining unit and the second image predicted by the image predicting unit to detect the moving object,
wherein the image obtaining unit obtains first and second images of the object by receiving the light source, which is generated in a plane and reflected from the object, through a single camera sensor,
wherein the image obtaining unit obtains a distance data between the light source and the object at the positions at which the first image and the second image are obtained, and
wherein the comparing / analyzing unit compares and analyzes a distance data at the position at which the second image is obtained by the image obtaining unit and a distance data of the predicted second image.

19. The mobile robot of claim 18, wherein the light source comprises a near-infrared laser beam.

20. The mobile robot of claim 18, wherein:
a moving vector T indicating a movement of the system after the first image is obtained, a rotational matrix R from a rotational angle $\theta$ of the system after the first image is obtained, and a distance vector T between the single camera sensor and the rotational axis of the system are represented as follows:

$$T = \lfloor T_x \quad T_y \rfloor,$$
$$R = \begin{bmatrix} \cos(\theta) & \sin(\theta) \\ -\sin(\theta) & \cos(\theta) \end{bmatrix}, \text{ and}$$
$$T1 = \lfloor T_{x1} \quad T_{y1} \rfloor;$$

the light source is defined as an origin, an x-axis is defined as a data axis having a negative that is a left side of the origin and a positive that is a right side of the origin, and a y-axis is defined as a distance axis, a distance data A calculated from the obtained first image and a distance data A' that is predicted after the movement of the system are represented as follows:

$$A \equiv \begin{bmatrix} x_1 & x_2 & \cdots & x_{n-1} & x_n \\ y_1 & y_2 & \cdots & y_{n-1} & y_n \end{bmatrix} \equiv \begin{bmatrix} X \\ Y \end{bmatrix} \equiv \lfloor A_1 \quad A_2 \quad \cdots \quad A_{n-1} \quad A_n \rfloor$$

$$A' \equiv \begin{bmatrix} x'_1 & x'_2 & \cdots & x'_{n-1} & x'_n \\ y'_1 & y'_2 & \cdots & y'_{n-1} & y'_n \end{bmatrix} \equiv \begin{bmatrix} X' \\ Y' \end{bmatrix} \equiv \lfloor A'_1 \quad A'_2 \quad \cdots \quad A'_{n-1} \quad A'_n \rfloor;$$

and
the image predicting unit comprises a data converting unit converting the distance data A calculated from the first image into the predicted distance data A' by using an equation A'=R(A−T−T1)+T1, and a data extracting unit extracting the predicted distance data A' calculated in the data converting unit by using a predetermined algorithm.

21. The mobile robot of claim 20, wherein the predetermined algorithm satisfies a following condition when representing a visual angle of the light source as $\alpha$:

$$\text{if, } |\arctan(y'_n, x'_n)| \geq \frac{a}{2}, \text{ then } A'_n = 0.$$

22. The mobile robot of claim 21, wherein the distance data calculated from the obtained image is a distance data from the light source to the object calculated by applying a triangular method to a coordinate value of the obtained image.

23. The mobile robot of claim 20, wherein when a maximum value and a minimum value in a vector X' of the predicted distance data extracted by the data extracting unit are indicated as $x'_{max}$ and $x'_{min}$, respectively, the comparing/analyzing unit compares the distance data between $x'_{max}$ and $x'_{min}$ in the distance data calculated from the obtained second image with the predicted distance data extracted by the data extracting unit.

24. The mobile robot of claim 23, wherein the distance data calculated from the obtained image is a distance data from the light source to the object calculated by applying a triangular method to a coordinate value of the obtained image.

25. The mobile robot of claim 20, wherein the distance data calculated from the obtained image is a distance data from the light source to the object calculated by applying a triangular method to a coordinate value of the obtained image.

* * * * *